(12) United States Patent
Daniel et al.

(10) Patent No.: US 6,765,045 B1
(45) Date of Patent: Jul. 20, 2004

(54) VULCANISABLE RUBBER COMPOSITION WITH SULPHUR CONTAINING SILICA

(75) Inventors: Marc Daniel, Greer, SC (US); Gérard Labauze, Clermont-Ferrand (FR)

(73) Assignee: Michelin Recherche et Technique S.A., Granges Paccot (CH)

( * ) Notice: Subject to any disclaimer, the term of this patent is extended or adjusted under 35 U.S.C. 154(b) by 0 days.

(21) Appl. No.: 09/462,387

(22) PCT Filed: Jun. 26, 1998

(86) PCT No.: PCT/EP98/03917

§ 371 (c)(1),
(2), (4) Date: Apr. 19, 2000

(87) PCT Pub. No.: WO99/02601

PCT Pub. Date: Jan. 21, 1999

(30) Foreign Application Priority Data

Jul. 9, 1997 (FR) ............................................. 97 08839

(51) Int. Cl.$^7$ ........................... C08K 5/31; C08K 5/372; C08K 3/36; C08L 9/00; B60C 9/00; B60C 11/00
(52) U.S. Cl. ....................... 524/237; 524/262; 524/492; 524/571; 524/572; 152/196; 152/209.1
(58) Field of Search ................................ 524/237, 262, 524/492, 571, 572; 152/196, 209.1, 905

(56) References Cited

U.S. PATENT DOCUMENTS 5,939,484 A * 8/1999 Araki et al. ................. 524/492
5,939,493 A * 8/1999 Hojo .......................... 525/332.6
6,517,653 B2 * 2/2003 Hahn .......................... 156/123
6,520,229 B1 * 2/2003 Muraoka et al. ........... 152/152.1

FOREIGN PATENT DOCUMENTS

EP            451604 A2 * 10/1991

* cited by examiner

Primary Examiner—Callie Shosho
(74) Attorney, Agent, or Firm—Baker Botts L.L.P.

(57) ABSTRACT

Rubber composition vulcanizable with sulfur and tire tread and tire casing comprising the composition, characterized in that the composition comprises:

a) at least one polymer selected from the group consisting of diene polymers, olefin/monomeric diene copolymers and isoolefin/halogenated para-alkylstyrene copolymers;

b) silica as filler;

c) at least one agent of the sulfur-containing silane type promoting the linkage between silica and polymer;

d) at least one substituted guanidine;

and in that it has at least one of the following characteristics:

It has at least one diene polymer which comprises at least one terminal amino group of an aliphatic or cycloaliphatic amine which is bonded thereto at the end of the chain, the polymer then being devoid of the alkoxysilane and silanol group;

the composition comprises at least one free aliphatic or cycloaliphatic amine.

16 Claims, No Drawings

VULCANISABLE RUBBER COMPOSITION WITH SULPHUR CONTAINING SILICA

BACKGROUND OF INVENTION

The present invention relates to elastomer compositions comprising silica as reinforcing filler, said compositions having improved hysteretic properties in the vulcanized state.

Since economizing on fuel and protection of the environment have become priorities, it is desirable to produce mixtures having the lowest possible hysteresis, in order to be able to use them as semi-finished products which enter into the make-up of tire casings, semi-finished products such as undercoats, binding gums between rubbers of different types, or for calendering metallic or textile reinforcements, sidewall gums or treads, and to obtain tires with improved properties, said tires having a reduced resistance to rolling in particular.

To achieve this objective, numerous solutions have been proposed consisting, in particular, in modifying tile nature of the diene polymers and copolymers at the end of polymerization by means of coupling agents, starring agents or functionalizating agents. The great majority of these solutions are essentially concentrated on the use of polymers modified with carbon black as reinforcing filler, with a view to obtaining a good interaction between the modified polymer and the carbon black, since the use of white reinforcing agents, notably silica, has proved inappropriate owing to the low value of some of its properties, and, as a result, of certain properties of the tires using these compositions.

As an illustrative example from the prior art, mention may be made of U.S. Pat. No. 4,677,165, which describes the reaction of living diene polymers functionalized by means of a benzophenone derivative to obtain polymers having improved properties in compositions containing carbon black as reinforcing filler. EP-A-0,451,604 describes, as functionalizing agent, a compound having an amino function which permits an improved interaction between the modified polymers and carbon black. With the same objective, U.S. Pat. No. 4,647,625 describes the functionalization of elastomers by reaction of a living polymer with N-methylpyrrolidine. EP-A-0,590,491 and EP-A-0,593,049 describe polymers having a tertiary amino function at the end of the chain and also permitting better interaction with carbon black.

Certain solutions have also been proposed concerning the use of silica as reinforcing filler in the compositions designed to constitute treads of tires. Functionalized polymers comprising alkoxysilane functions at the end of the polymer chains, as described in EP-A-0,299,074 and EP-A-0,447,066, have been proposed For this purpose. It is only these functionalized polymers that have been described in the prior art as being effective in reducing the hysteresis and improving the resistance to abrasion, but the industrial manufacture of these polymers poses problems due to macrostructure development during the recovery stages such as stripping or drying. To attempt to solve these problems, the use of polymers functionalized with non-hydrolyzable alkoxysilane functions, as described in U.S. Pat. No. 5,066,721 have been proposed, but their effectiveness in a mixture with silica is reduced. The preparation of diene polymers having an amino function is known to persons skilled in the art, e.g. from U.S. Pat. No. 4,894,409, which describes the preparation of polymers functionalized with aromatic amines. The polymers having an amine function are not very effective when used with silica, as mentioned in EP-A-0,661,298.

This interest in silica-reinforced compositions was revived with the publication of EP-A-0,501,227 which discloses a rubber composition vulcanizable with sulfur, obtained by thermomechanical working of a copolymer of a conjugated diene and a vinylaromatic compound, prepared by solution polymerization, with 30 to 150 parts by weight per 100 parts by weight of elastomer of a particular precipitated silica, which represents an excellent compromise between several contradictory properties, and which for the first time permits the commercialization of tires possessing a silica-filled tread showing the excellent compromise that is required.

Mention may also be made of European Patent document EP-A-819,731, which discloses a silica-reinforced composition essentially comprising a diene elastomer consisting of a copolymer having amino functions and a silica/elastomer linking agent of the sulfurated silane type. Along its chain, this copolymer has amino groups originating from non-aliphatic or cycloaliphatic amines and an aminated vinylaromatic monomer.

It will be noted that the problem that is supposed to be solved in this last document does not relate to obtaining improved hysteretic properties.

SUMMARY OF THE INVENTION

The present invention relates to a new rubber composition containing silica or a mixture of silica and carbon black as reinforcing filler, said composition having satisfactory properties when used in the crude state and improved properties in the vulcanized state, particularly an excellent hysteresis and excellent reinforcement.

The invention also relates to treads of tires comprising at least one composition in accordance with the invention, as well as to treads obtained by vulcanization of these treads.

The invention also relates to casings of tires comprising at least one composition according to the invention, as well as to tire casings obtained by vulcanization of these casings, at least one composition of the invention being used, e.g., in the tread.

The rubber composition vulcanizable with sulfur, according to the invention, is characterized in that it comprises:

a) at least one polymer selected from the group consisting of diene polymers, olefin/monomeric diene copolymers and halogenated isoolefin/para-alkylstyrene copolymers;

b) silica as filler;

c) at least one agent promoting binding between silica and polymer, said agent having the formula

 (I)

wherein n is an integer between 2 and 8, $R^1$ and $R^2$, which may be the same or different, are each selected from among substituted or unsubstituted alkylene groups having 1 to 18 carbon atoms and substituted or unsubstituted arylene groups having 6 to 12 carbon atoms, $Z^1$ and $Z^2$, which may be the same or different, each represents a group

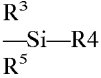

where $R^3$, $R^4$ and $R^5$, which may be the same or different, are each selected from among alkyl groups having 1 to 4 carbon atoms, phenyl groups, alkoxy groups having 1 to 8 carbon atoms, and cycloalkoxy groups having 5 to 8 carbon atoms, with the proviso that at least one of $R^3$, $R^4$ and $R^5$ is an alkoxy or cycloalkoxy; and d) at least one guanidine substituted by at least two groups, which may be the same or different, and selected from among alkyl, aryl or aralkyl groups;

and wherein the rubber composition has at least one of the following characteristics:

It comprises at least one diene polymer which has at least one terminal amino group of an aliphatic or cycloaliphatic amine which is bonded thereto at the end of the chain, the polymer then being devoid of alkoxysilane and silanol group;

The composition comprises at least one free aliphatic or cycloaliphatic amine.

DETAILED DESCRIPTION OF THE INVENTION

In the description that follows, the term "polymer" covers both homopolymers and copolymers; the term "copolymer" referring to polymers obtained from two or more than two monomers, e.g. terpolymers.

Understood by a diene polymer is any homopolymer obtained by polymerization of a conjugated diene monomer having 4 to 12 carbon atoms, any copolymer obtained by copolymerization of one or more conjugated diene with each other or with one or more vinylaromatic compounds having 8 to 20 carbon atoms. As conjugated diene, mention may be made of e.g. 1,3-butadiene, 2-methyl-1,3-butadiene, 2,3-di ($C_1$–$C_5$-alkyl)-1,3-butadiene such as, e.g., 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, an aryl-1,3-butadiene, 1,3-pentadiene, and 2,4-hexadiene.

Suitable vinylaromatic compounds are, in particular, styrene, ortho-, meta- and paramethylstyrene, the commercial "vinyl-toluene" mixture, p-tert.-butylstyrene, the methoxystyrenes, chlorostyrenes, vinylmesitylene, divinylbenzene, and vinylnaphthalene.

The copolymers may contain, e.g., between 99% and 20% by weight of diene units and from 1% to 80% by weight of vinylaromatic units. The polymers may have any microstructure, which is a function of the polymerization conditions used, notably of the presence or absence of a modifying agent and/or randomizing agent and of the amounts of modifying and/or randomizing agent used.

Polybutadienes are preferred, particularly those having a 1,2-linkage content of between 1% and 80%, as well as polyisoprenes, and copolymers of butadiene and styrene in particular, those having a styrene content of between 5 and 50% by weight, and more particularly between 20% and 40% by weight, a 1,2-linkage content of the butadiene part of between 4% and 65%, and a trans-1,4 linkage content of between 30% and 80%. Suitable butadiene-styrene-isoprene copolymers are those having a styrene content of between 5 and 50% by weight, more particularly between 10% and 40%, an isoprene content of between 15% and 60% by weight, more particularly between 20% and 50% by weight, and a butadiene content of between 5% and 50% by weight, more particularly between 20% and 40% by weight, wherein the butadiene part has a 1,2-linkage content of between 4% and 85% and a trans-1,4 linkage content of between 6% and 80%, and the isoprene part has a 1,2-linkage content plus 3,4-linkage content of between 5% and 70% and a trans-1,4-linkage content of between 10% and 50%.

When the diene polymer has an amino terminal group, it is then devoid of an alkoxysilane group and silanol group and may be a homopolymer or copolymer obtained from the above-mentioned monomers, wherein said polymer can be obtained by initiation or functionalization.

In the case where the terminal amino group is introduced by initiation, the polymerization is advantageously carried out with an initiator of the lithium amide type, as described in the literature, e.g. in the work of T. C. Cheng, "Anionic Polymerization," published by the American Chemical Society, Washington, p. 513, 1981, whose content is incorporated herein. This lithium amide, has the formula

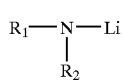

(II)

wherein $R_1$ and $R_2$, independently of one another, are an alkyl group, or together form a cycloalkyl, the number of carbon atoms of the compound formed by $R_1$ and $R_2$ preferably being 2 to 15.

As a preferred example, $R_1$ and $R_2$ may each be an ethyl or butyl group, or together form a cycloalkyl radical having 4 to 6 carbon atoms.

When necessary, the initiator of formula (II) is prepared in the presence of a polar agent such as tetrahydrofuran, by reacting the corresponding amine $R_1$—NH—$R_2$, such as hexamethyleneimine, with an alkyllithium, such as n-butyllithium.

In the case where the amino end group is introduced by functionalization at the end of polymerization, the functionalization procedures described in, e.g., EP-A-451,604, U.S. Pat. No. 4,647,625 or in Kenji Ueda et al., "Synthesis of polymers with amino end groups. 3. Reactions of anionic living polymers with α-halo-ω-aminoalkanes with a protected amino functionality," *Macromolecules* 23: 939–945 (1990), may be used.

The polymerization may be carried out by a continuous or a discontinuous process. The polymerization is generally carried out at a temperature between 20° C. and 120° C., preferably between 30° C. and 90° C.

The olefin/diene copolymers can be, notably, EPDM's (ethylene-propylene-diene monomer), such as ethylene-propylene-1,4-hexadiene copolymers, ethylene-propylene-ethylidenenorbornene copolymers, ethylene-propylene-dicyclopentadiene copolymers, butyl rubbers, particularly isobutylene-halogenated isoprene copolymers, as the case may be. The isoolefin/halogenated para-alkylstyrene copolymers can be, e.g. the isobutylene-/halogenated para-methylstyrene rubber marketed by Exxon under the trade name EXXPRO.

The polymers may be, e.g., block polymers, statistical polymers, sequenced polymers, microsequenced polymers, and can be prepared by dispersion polymerization, solution polymerization, bulk polymerization, or in a gaseous phase.

The composition according to the invention may comprise a mixture of two or more polymers defined above.

The free aliphatic or cycloaliphatic amine may be a primary, secondary or tertiary amine. By way of nonlimiting examples, mention may be made, e.g., of the following amines: butyl, dibutyl, tributylamines, pentyl, dipentyl, tripentylamines, hexyl, dihexyl, trihexylamines, cyclohexyl, dicyclohexyl, tricyclohexyl amines, benzyl, dibenzyl, tribenzylamines, octyl, dioctyl, trioctylamines, decyl, didecylamines, dodecyl, didodecylamines, pyrrolidine and alkyl pyrrolidines, piperidine and alkylpiperidines, hexamethyleneimine and alkylhexamethyleneimines, wherein said amines may be used alone or in a mixture with one another.

Preferably, the free amine content or the mixture of free amines ranges from 0.5 to 4% by weight calculated on the total weight of silicas, said content advantageously being between 1 and 3% by weight.

The substituted guanidine may be, e.g., triphenylguanidine, diphenylguanidine, or di-o-tolylguanidine. The composition may comprise a mixture of two or more substituted guanidines.

The content of substituted guanidine or mixture of substituted guanidines is 0.5 to 4% by weight calculated on the silica or total of silicas, said content advantageously being 1 to 3% by weight.

The silica used as filler may be any silica known to persons skilled in the art having a BET surface of less than or equal to 450 m$^2$/g, a specific surface area CTAB of less than or equal to 450 m$^2$/g, even though this improvement is more pronounced with a highly dispersible precipitated silica. Understood by the term "highly dispersible silica" is any silica capable of deagglomeration and dispersion in a very large amount of polymeric matrix, observable on fine sections by electron microscopy or optical microscopy. Nonlimiting examples of such preferred, highly dispersible silicas are those obtained according to the processes described in EP-A-0,157,703 and EP-A-0,520,862, or the Zeosil silica 1165 MP of Rhône-Poulenc, the Perksasil silica KS 430 of Akzo, silica Hi-Sil 2000 of PPG, and silicas Zeopol 8741 and Zeopol 8745 of Huber Co. According to the invention, the beneficial effect is obtained regardless of the physical state in which the silica is present, i.e whether it is in powder form, micropearl form, granulated form, spherical form, and regardless of what the specific surface area of the silica is. It is also possible to use blends of different silicas and use other white fillers, such as chalk, kaolin or alumina.

In combination with silica, it is possible, if necessary, to use carbon black in the reinforcing filler, notably all carbon blacks that are commercially available or conventionally used in tires, particularly in treads.

The filler comprises one or more silicas or it contains at least 40% by weight—and advantageously at least 50% by weight—a silica or mixture of silicas.

The reinforcing filler, which may thus comprise silica without carbon black or both silica and carbon black, is present in the composition in an amount which may range, e.g., from 30 to 100 parts by weight of the polymer or mixture of polymers.

By way of example of an agent of formula (I) which promotes linking between the silica or combination of silicas and the diene polymer or mixture of diene polymers, mention may be made of the 2,2'-bis(trimethoxysilylethyl) polysulfides, the 3,3'-bis(trimethoxysilylpropyl) polysulfides, the 3,3'-bis(triethoxysilylpropyl) polysulfides, the 2,2'-bis(triethoxysilylpropyl) polysulfides, the 2,2'-bis(tripropoxysilylethyl) polysulfides, the 2,2'-bis(tri-sec-butoxysilylethyl) polysulfides, the 3,3'-bis(tri-tert-butoxysilylethyl) polysulfides, the 3,3'-bis(triethoxysilylethyltolylene) polysulfides, the 3,3'-bis(trimethoxy-silylethyltolylene) polysulfides, the 3,3'-bis(triisopropoxysilylpropyl) polysulfides, the 3,3'-bis(trioctoxysilylpropyl) polysulfides, the 2,2'-bis(2'-ethylhexoxysilylethyl) polysulfides, the 2,2'-bis(dimethoxyethoxysilylethyl) polysulfides, the 3,3'-bis(methoxyethoxypropoxysilylpropyl) polysulfides, the 3,3'-bis(methoxydimethylsilylpropyl) polysulfides, the 3,3'-bis(cyclohexoxydimethylsilylpropyl) polysulfides, the 4,4'-bis(trimethoxy-silylbutyl) polysulfides, the 3,3'-bis(trimethoxysilyl-3-methylpropyl) polysulfides, the 3,3'-bis(tripropoxysilyl-3-methylpropyl) polysulfides, the 3,3'-bis(trimethoxymethylsilyl-3-ethylpropyl) polysulfides, the 3,3'-bis(trimethoxy-silyl-2-methylpropyl) polysulfides, the 3,3'-bis(dimethoxyphenylsilyl-2-methylpropyl) polysulfides, the 3,3'-bis(trimethoxysilylcyclohexyl) polysulfides, the 12,12'-bis(trimethoxysilyldodecyl) polysulfides, the 12,12'-bis(triethoxysilyl-dodecyl) polysulfides, the 18,18'-bis(trimethoxysilyloctadecyl) polysulfides, the 18,18'-bis(methoxydimethylsilyloctadecyl) polysulfides, the 2,2'-bis(trimethoxysilyl-2-methylethyl) polysulfides, the 2,2'-bis(triethoxysilyl-2-methylethyl) polysulfides, the 2,2'-bis(tripropoxysilyl-2-methylethyl) polysulfides, and the 2,2'-bis(trioctoxysilyl-2-methylethyl) polysulfides. Such a linking agent is, e.g., that sold by Degussa under the trade designation Si69 whose average formula is bis(3-triethoxysilylorioyl) tetrasulfide. These polysulfides can be used alone or in a mixture with each other.

By preference, n in the linking agent of formula (I) is greater than 2, or if there are several such agents, at least 80% of n is greater than 2 for the total of these compounds.

The content of the agent of formula (I) or mixture of such agents is preferably at least 4% of the weight of silica or of the mixture of silicas used as filler.

The compositions according to the invention can also contain other constituents and additives conventionally used in rubber mixtures, such as plasticizers, pigments, antioxidants, sulfur, vulcanization accelerants, extender oils, one or more linking agents of formulas other than (I) and/or one or more silica coating agents such as polyols, alkoxysilanes, in addition to the agent of formula (I). Preferably only one or more agents of formula (I) are used as silica coating agents, or if other linking agents are present, the weight of the linking agent or agents of formula (I) is greater than 50% of the weight of the total of linking agents.

The invention is illustrated in more detail by the following examples, which in no way limit the scope of the invention.

In the examples, the properties of the fillers, particularly of silica, and the properties of the compositions are evaluated as follows:

Mooney viscosity: ML(1+4) at 100° C. measured according to ASTP D-1646; it will be referred to below as "ML(1+4)100°."

Elongation modulus at 300% (EM 300), 100% (EM 100) and 10% (EM 10), determined according to the standard ISO 37.

Scott tear index measured at 20° C. (hereinafter abbreviated as Scott20°), the rupture force (Fr) is expressed in MPa and the elongation at rupture (Er) is expressed in %.

Hysteretic losses: Measured by rebound at 60° C., the deformation is of the order of 40%; these losses are referred to below as "HL", the word deformation being abbreviated to "def."

Dynamic properties under shear, according to ASTM D2231-71 (reapproved in 1977), measurements carried out as a function of the deformation at 23° C. and 10 Hz. The nonlinearity, expressed in MPa, which is the difference of shear modulus between 0.15% and 50% of the peak-to-peak deformation, is referred to below as "DeltaG*." The hysteresis is expressed by measurement of tgδ and G" at 7% deformation.

In all the examples which follow, the values relating to the various components of the compositions—unless otherwise indicated—are given as parts by weight per 100 parts by weight of elastomer or mixture of elastomers (pce); the styrene contents of the polymers are expressed in % by mass, and the content of 1,2-vinyl chains of the polymers is expressed in % relative to the butadiene units incorporated.

EXAMPLE 1

The following basic formula F1 is used:

| SBR | 100 |
|---|---|
| Silica (1) | 80 |
| Aromatic oil | 40 |
| Linking agent (2) | 6.4 |
| ZnO | 2.5 |
| Stearic acid | 1.5 |
| Antioxidant (6PPD) | 1.9 |
| Ozone wax C32T | 1.5 |
| Sulfur | 1.1 |
| Sulfenamide (CBS) | 2 |
| Diphenylguanidine | 1.5 |

(1)=ZEOSIL 1165 silica (Rhône-Poulenc)
(2)=Linking agent: Si69 (Degussa)

The abbreviation "SBR" represents a styrene-butadiene elastomer chosen from the group comprising the following three products, all of them solution-polymerized (SSBR).

SSBR A: 1,2 content=41%; styrene content=26%. Tg=−38° C.; ML(1+4)100° C.=30;

SSBR B: Same macro- and microstructure as SSBR A. (Tg=−38° C.; ML(1+4)100°=30), but initiated with hexamethyleneiminolithium HMINLi (tertiary cycloaliphatic amine fixed at the end of the SBR chain).

SSBR C: Same macro- and microstructure as SSBR A. (Tg=−38° C.; ML(1+4)100°=30), but containing free dodecyl-hexamethyleneimine (DDCHMI) introduced just before the stripping stage, after stopping the polymerization.

The synthesis of these elastomers is carried out by a discontinuous process in the following manner.

Preparation of SSBR A

Into a 10-liter reactor containing 6.4 liters of de-aerated cyclohexane is injected 167 g of styrene, 476 g of butadiene and 1,500 ppm of THF. The impurities are neutralized with n-butyllithium, and 0.0035 mole of n-BuLi is then added, followed by 0.0019 mole of sodium tert-butylate used as randomizing agent. The polymerization is carried out at 55° C.

At 98% conversion, polymerization is stopped by adding 0.0050 mole of methanol. The polymer solution is stirred for 15 minutes at 55° C.

The polymer is antioxidized by the addition of 0.20 g per 100 g of elastomer (pce) of 2,2'-methylene bis-(4-methyl-6-tert-butylphenol) and 0.20 pce of N-(1,3-dimethylbutyl)-N'-phenyl-p-phenylenediamine. The solvent is eliminated by steam distillation and the polymer is dried on a cylindrical tool at 100° C.

The inherent viscosity of the product is 1.43 dL/g.

The percentage of styrene ($^1$H NMR) is 26%; the amount of vinyl chains is 41%.

Preparation of SSBR B

SSBR B is prepared under conditions identical to those described for SBR A, with the exception that polymerization is accomplished by the addition of 0.038 mole of hexamethyleneimine lithium (HMINLI), used in place of n-BuLi.

The inherent viscosity of the polymer is 1.45 dL/g.

Preparation of SSBR C

SSBR C is synthesized under conditions identical to those described for SSBR A, with the exception of the end of the reaction. 30 mEq./kg of dodecylilexamethyleneimine (DDCHMI) (0.8 pce) are added to the polymeric solution after the polymerization is stopped with methanol and before stripping the solvent by steam distillation.

Using the aforementioned elastomers, the following four compositions are prepared:

Composition 1: Formula F1 in which the SBR is SSBR A.

Composition 2: Formula F1, in which the SBR is SSBR B.

Composition 3: Formula F1 in which the SBR is SSBR C.

Composition 4: Formula F1 in which the SBR is SSBR A and which additionally contains 0.8 pce of free dodecylhexamethyleneimine (DDCHMI).

Composition 1 is a control composition, while Compositions 2, 3 and 4 are in conformity with the invention.

To prepare the mixtures which lead to the compositions, a two-stage thermomechanical operation is carried out which lasts 5 and 4 minutes, respectively, using an internal paddle mixer at an average paddle speed of 45 rpm, until attaining a maximum temperature of 160° C. The finishing stage is performed at 30° C. In the case of Composition 4, the addition of the free amine (DDCHMI) is performed with the aid of the internal mixer during the first stage of the thermomechanical operation.

All compositions are vulcanized at 150° C. for 50 minutes.

The resulting properties of Compositions 1 to 4 in both the non-vulcanized state and the vulcanized state are compared with each other.

The results are listed in Table 1.

TABLE 1

| Compositions | 1 | 2 | 3 | 4 |
|---|---|---|---|---|
| | F1 | F1 | F1 | F1 + 0.8 pce amine |
| | SSBR A | SSBRA B | SSBR C | SSBR A |
| Initiator | nBuli | HMIN1i | nBuLi | nBuLi |
| Stopper | MeOH | MeOH | MeOH + Amine | MeOH |
| | invention | invention | invention | |

TABLE 1-continued

| Compositions | 1 | 2 | 3 | 4 |
|---|---|---|---|---|
| Properties in the nonvulcanized state: | | | | |
| ML (1 + 4) 100° | 51 | 55 | 54 | 51 |
| Properties in the vulcanized state: | | | | |
| Shore | 64.0 | 58.8 | 56.5 | 59.4 |
| EM 10 | 5.10 | 3.83 | 3.48 | 3.95 |
| EM 100 | 1.72 | 1.71 | 1.61 | 1.57 |
| EM 300 | 2.03 | 2.26 | 2.19 | 1.96 |
| EM 300/EM 100 | 1.18 | 1.32 | 1.36 | 1.25 |
| Scott 20° Fr | 18.1 | 20.9 | 20.4 | 19.0 |
| Er % | 520 | 580 | 580 | 570 |
| HL | 33.2 | 25.1 | 26.1 | 29.4 |
| (def = 40%) | | | | |
| Dynamic properties under deformation (10 Hz/def 0.15%–50%): | | | | |
| DeltaG* | 4.05 | 1.09 | 1.03 | 1.95 |
| tgδ | 0.355 | 0.216 | 0.224 | 0.266 |
| G" | 1.230 | 0.433 | 0.436 | 0.690 |

Table 1 shows that the three compositions according to the invention, Compositions 2 to 4, have hysteretic properties that are considerably improved in comparison to the control composition 1, this being so both at low deformation (tgδ values and G") and at high deformation (HL values), and that these compositions of the invention have reinforcing properties and rupture qualities that are considerably better than those of the control composition (EM300/EM100 and Scott20° values). Thus, this improvement can be obtained with a non-functionalized polymer (Compositions 3 and 4).

It is further noted that Composition 4, while being better than the control composition for the above reasons, has properties that are slightly poorer than those of Compositions 2 and 3, which shows that the introduction of the amine bonded to the polymer or perfectly dispersed in the elastomeric matrix by adding it in solution form before stripping is more effective for improving the hysteretic properties and mechanical cohesion.

EXAMPLE 2

The same basic formula F1 as in Example 1, and the following four SSBR's are used.

SSBR D: Tg=−38° C.; 1,2 content=41%; styrene content= 26%; ML(1+4)100°=70

SSBR E: Tg=−38° C.; 1,2 content=41%; styrene content= 26%; functionalized with hexamethylcyclotrisiloxane (D3); ML(1+4)100°=60

SSBR F: Tg=−38° C.; 1,2 content=41%; styrene content= 26%; starred by means of tin tetrachloride; ML(1+4) 100°=70

SSBR G: Tg=−38° C.; 1,2 content=41%; styrene content= 26%; functionalized with bis-diethylaminobenzophenone; ML(1+4)100°=70

All these elastomers are synthesized by a continuous process, in the following manner:

Preparation of SSBR's D, E and G

Into a reactor of 14 L useful capacity and equipped with a turbine-type stirrer are continuously introduced cyclohexane, butadiene, styrene and tetrahydrofuran in mass proportions of 100:10.00:4.30:0.3, respectively, as well as a solution of n-butyllithium (SSBR D and G: 460 micromoles of active n-BuLi per 100 grams of monomers; SSBR E: 500 micromoles). The flow rates of these different solutions are calculated so that the dwelling time is 40 minutes under strong agitation. The temperature is kept constant at 60° C. At the exit from the reactor, the conversions measured on samples are 85% (SSBR D and G) and 88% (SSBR E). The three SBR's contain 26% incorporated styrene (by weight) and have a 1,2 bond content of 41% for the butadiene part.

SSBR D is stopped by the addition of methanol (MeOH/ n-BuLi ratio=1.5).

SSBR E is stopped by the addition of D3 (D3/n-BuLi ratio=0.40).

SSBR G is stopped by the addition of bis-diethylaminobenzophenone (BDEAB/n-BuLi ratio=1.5).

For the two polymers E and G, a contact time of 40 minutes between polymer and amine is assured by means of a second reactor stirred and heated at 60° C.

For the three elastomers, there is added 0.8 pce of 2,2'-methylene bis(4-methyl-6-tert.-butylphenol) and 0.2 pce of N-(I,3-dimethylbutyl)-N-phenyl-p-phenylenediamine used as antioxidants. The polymers are separated from the solvent by stripping the solvent by steam distillation, then dried on a 100° C. tool for 10 minutes. The inherent viscosities (in toluene) are measured before the stripping operation.

The function content $[Si(CH_3)_2OH]$ is determined by proton NMR assay.

The $^1H$ NMR assay is carried out on a sample which has undergone three dissolution cycles in toluene, and coagulation in methanol, to eliminate any possible trace of residual hexamethylcyclotrisiloxane (not linked to the polymer). The molecular mass of SSBR E is 175,000 g mole$^{-1}$.

The $^1H$ NMR spectrum of dimethyl-silanol-functionalized SSBR E is characterized by peaks at 0.05 ppm and 0.1 ppm corresponding to the $Si(CH_3)_2$ group. The content of $[Si(CH_3)_2OH]$ units is 4.6 mEq./kg, or 81% of functionalized chains.

The amount of $[(C_2H_5)_2N—C_6H_4]_2$ COH units of SSBR G is 5 mEq./kg, or 90% of functionalized chains. The molecular mass of SSBR G is 180,000 g mole$^{-1}$.

Preparation of SSBR F

SSBR F is synthesized under conditions analogous to those described for SSBR D and E, except for the amount of BuLi used and the mode of stoppage.

The amount of active n-BuLi is 900 micromoles per 100 grams of monomers.

At the exit from the reactor, the conversion is 92% (viscosity: 1.26 dL/g), the tin tetrachloride is injected upstream of a static mixer comprising 24 elements. The antioxidants are added 5 minutes after injection of $SnCl_4$. The viscosity after starring is 1.85 dL/g.

Eight compositions numbered 5 to 11 are prepared in the following manner:

Composition 5: Formula F1 in which the SBR is SSBR D;
Composition 6: Composition 5 to which 0.8 pce of DDCHMI has been added;
Composition 7: Formula F1 in which the SBR is SSBR E;
Composition 8: Composition 7 to which 0.8 pce of DDCHMI has been added;
Composition 9: Formula F1 in which the SBR is SSBR F;
Composition 10: Composition 9 to which 0.8 pce of DDCHMI has been added;
Composition 11: Formula F1 in which the SBR is SSBR G;
Composition 12: Composition 11 to which 0.8 pce of DDCHMI has been added.

The preparation of the compositions by mixing, and their vulcanization, are carried out as in Example 1. For Compositions 6, 8, 10 and 12, the amine was added using an internal mixer during the first stage of the thermo-mechanical operation.

Compositions 5, 7, 9, and 11 are control compositions, while Compositions 6, 8, 10 and 12 are in conformity with the invention.

The tests are performed under the same conditions as in Example 1, and the results are listed in Table 2.

Compositions 6, 8, 10, and 12 according to the invention show that, with any functionalized or starred elastomer, the addition of free amine provides significant improvement in hysteresis and reinforcement, compared with the properties obtained with the conventional compositions prepared without the addition of free amine, and even in comparison to those which comprise a polymer having aromatic dialkylamine functions at the chain end.

EXAMPLE 3

The following basic formulas F2 and F3 are used.

| Formula F2: | |
|---|---|
| SBR | 100 |
| Silica (1) | 60 |
| Aromatic oil | 20 |
| Linking agent (2) | 4.8 |
| ZnO | 2.5 |
| Stearic acid | 1.5 |
| Antioxidant (6PPD) | 1.9 |
| Ozone wax C32T | 1.5 |
| Sulfur | 1.1 |
| Sulfenamide (CBS) | 2 |
| Diphenylguanidine | 1.1 |

(1) ZEOSIL 1165 silica (manufactured by Rhone-Poulenc)
(2) Linking agent: Si69 (Degussa)

| Formula F3: | |
|---|---|
| SBR | 100 |
| Silica (1) | 40 |
| N 234 Black | 40 |
| Aromatic oil | 40 |
| Linking agent (2) | 3.2 |
| ZnO | 2.5 |
| Stearic acid | 1.5 |
| Antioxidant (6PPD) | 1.9 |

TABLE 2

| | Compositions | | | | | | | |
|---|---|---|---|---|---|---|---|---|
| | 5 | 6 | 7 | 8 | 9 | 10 | 11 | 12 |
| | F1 | F1 + DDCHM1 0.8 pce | F1 | F1 + DDCHM1 0.8 pce | F1 | F1 + DDCHM1 0.8 pce | F1 | F1 + DDCHM1 0.8 pce |
| | | SSBR D | | SSBR E | | SSBR F | | SSBR G |
| Stopper | | MeOH | | D3 | | $SpCl_4$ | | BDEAB |
| Properties in the nonvulcanized state: | | | | | | | | |
| ML (1 + 4) 100° | 79 | 76 | 87 | 86 | 43 | 42 | 85 | 80 |
| Properties in the vulcanized state: | | | | | | | | |
| Shore | 63.3 | 59.0 | 59.2 | 58.8 | 60.8 | 58.7 | 62.8 | 59.7 |
| EM10 | 5.12 | 4.05 | 3.89 | 3.72 | 4.53 | 4.13 | 5.00 | 4.10 |
| EM100 | 1.57 | 1.43 | 1.61 | 1.69 | 1.54 | 1.46 | 1.58 | 1.48 |
| EM300 | 1.75 | 1.73 | 2.01 | 2.23 | 1.74 | 1.71 | 1.81 | 1.81 |
| EM300/EM100 | 1.11 | 1.21 | 1.25 | 1.32 | 1.13 | 1.17 | 1.14 | 1.22 |
| Scott20° Fr | 21.1 | 20.9 | 24.0 | 25.0 | 17.6 | 18.1 | 21.6 | 21.8 |
| Er % | 650 | 680 | 610 | 590 | 600 | 620 | 610 | 640 |
| HL (def = 40%) | 33.1 | 29.1 | 24.6 | 22.5 | 37.4 | 35.6 | 32.4 | 28.6 |
| DeltaG* | 4.81 | 2.70 | 1.48 | 1.18 | 3.00 | 2.23 | 3.43 | 2.12 |
| tgδ | 0.370 | 0.281 | 0.249 | 0.228 | 0.336 | 0.305 | 0.321 | 0.265 |
| G" | 1.430 | 0.890 | 0.576 | 0.488 | 1.060 | 0.843 | 1.150 | 0.840 |

-continued

Formula F3:

| | |
|---|---|
| Ozone wax C32T | 1.5 |
| Sulfur | 1.1 |
| Sulfenamide (CBS) | 2 |
| Diphenylguanidine | 0.8 |

(1) ZEOSIL 1165 silica (manufactured by Rhone-Poulenc)
(2) Linking agent: Si69 (Degussa)

With the aid of these two basic formulations, compositions were prepared using the elastomers SSBR A and SSBR B of Example 1.

These compositions are as follows:

Composition 11: Formula F2, with SSBR A as the SBR;
Composition 12: Formula F2, with SSBR B as the SBR;
Composition 13: Formula F2, with SSBR A as the SBR, and additionally containing 0.8 pce of DDCHMI;
Composition 14: Formula F3, with SSBR A as the SBR;
Composition 15: Formula F3, with SSBR B as the SBR.
Compositions 11 and 14 are control compositions, while Compositions 12, 13 and 15 are in conformity with the invention.

The preparation of the compositions by mixing and their vulcanization are carried out as in Example 1. The addition of the free amine to Composition 13 is done with the aid of the internal mixer during the first stage of this thermomechanical operation.

The results are listed in Tables 3 and 4.

TABLE 3

| Compositions | 11 | 12 | 13 |
|---|---|---|---|
| Formula | F2 | F2 | F2 + amine |
| Amine | 0.8 pce DDCHM1 | | |
| SSBR | SSBR A | SSBR B | SSBR A |
| Initiator | nBuLi | HMINLi | nBuLi |
| Stopper | MeOH | MeOH | MeOH |
| Properties in the nonvulcanized state: | | | |
| ML (1 + 4) 100" | 64 | 78 | 69 |
| Properties in the nonvulcanized state: | | | |
| Shore | 64.2 | 57.2 | 55.3 |
| EM 10 | 5.41 | 3.68 | 3.38 |
| EM 100 | 1.88 | 1.72 | 1.52 |
| EM 300 | 2.20 | 2.44 | 2.13 |
| EM 300/EM 100 | 1.17 | 1.42 | 1.40 |
| Scott 20° Fr | 22.8 | 23.5 | 23.1 |
| Er % | 570 | 540 | 570 |
| HL | 27.2 | 18.9 | 22.8 |
| (def = 35%) | | | |
| Dynamic properties under deformation (10 Hz/def 0.15%–50%): | | | |
| DeltaG* | 3.07 | 0.39 | 0.38 |
| tgδ | 0.281 | 0.143 | 0.148 |
| G" | 0.878 | 0.247 | 0.252 |

Table 3 shows, in view of the properties in the vulcanized state, that the addition of free dodecylhexamethyleneimine (Composition 13) or the presence of hexamethyleneimine at the chain end (Composition 12) makes it possible to significantly improve the hysteresis and reinforcement in comparison to the properties obtained with the conventional Composition 11, which is not in conformity with the invention.

TABLE 4

| Compositions | 14 | 15 |
|---|---|---|
| Formula | F3 | F3 |
| SSBR | SSBR A | SSBR B |
| Initiator | nBuLi | HMINLi |
| Stopper | MeOH | MeOH |
| Properties in the nonvulcanized state: | | |
| Shore | 63.4 | 61.9 |
| EM 10 | 5.22 | 4.77 |
| EM 100 | 1.62 | 1.75 |
| EM 300 | 1.72 | 2.07 |
| EM 300/EM 100 | 1.06 | 1.18 |
| Scott 20° Fr | 17.8 | 19.0 |
| Er% | 650 | 580 |
| HL | 42.1 | 35.3 |
| (def = 40%) | | |
| Dynamic properties under deformation (10/Hz/def 0.15%–50%): | | |
| Delta G* | 6.04 | 3.91 |
| tgδ | 0.421 | 0.365 |
| G" | 1.770 | 1.250 |

This table shows that, in the case of a filler based on carbon black and silica in a 50:50 mass proportion, the addition of amine to the elastomer chain improves the properties of hysteresis and reinforcement in comparison to the properties obtained with the corresponding control mixture 14, whose elastomer does not contain amine.

EXAMPLE 4

In this example, the following four compositions are used.
Composition 16: Basic formula F1 in which the SBR is SSBR A;
Composition 17: Composition 16 wherein the DPG is replaced with 1.9 pce of dodecylhexamethyleneimine (DDCHMI), or 7.1 mmoles, the DDCHMI content in mmoles being the same as that of DPG in basic formula F1 (also 7.1 mmoles);
Composition 18: Composition 16 in which the DPG content is 2.5 pce (or 11.8 mmoles) instead of 1.50 pce (7.1 mmoles);
Composition 19: Composition 16, to which 1.2 pce (4.5 mmoles) of DDCHMI has been added.

Composition 19 is the only one that is in conformity with the invention; Compositions 16 to 18 are control compositions.

The compositions are prepared and vulcanized as in Example 1. The addition of amines in Compositions 17 and 19 is carried out with the aid of the internal mixer during the first stage of this thermomechanical operation.

The results are listed in Table 5.

TABLE 5

| Compositions | 16 | 17 | 18 | 19 |
|---|---|---|---|---|
| Formula | F1 | F1 | F1 | F1 |
| DPG (PCE) (mmol) | 1.50 (7.1) | 0 | 2.5 (11.8) | 1.5 (7.1) |
| DDCHMI ADDED (PCE) | 0 | 1.9 (7.1) | 0 | 1.2 (4.5) |
| Properties in the nonvulcanized state: | | | | |
| ML (1 + 4) 100° | 51 | 46 | 47 | 54 |
| Properties in the vulcanized state: | | | | |
| Shore | 64.0 | 63.3 | 62.8 | 60.0 |
| EM 10 | 5.10 | 5.17 | 4.32 | 4.15 |

TABLE 5-continued

| Compositions | 16 | 17 | 18 | 19 |
|---|---|---|---|---|
| EM 100 | 1.72 | 1.50 | 1.89 | 1.65 |
| EM 300 | 2.03 | 1.57 | 2.59 | 2.07 |
| EM 300/EM 100 | 1.18 | 1.05 | 1.37 | 1.25 |
| Scott 20° Fr | 18.1 | 18.3 | 20.4 | 20.8 |
| Er% | 520 | 670 | 500 | 560 |
| HL (def = 35) | 33.2 | 38.4 | 26.2 | 29.3 |
| Dynamic properties under deformation (10 Hz/def 0.15%–50%): | | | | |
| DeltaG* | 4.05 | 3.43 | 2.71 | 1.64 |
| tgδ | 0.355 | 0.308 | 0.306 | 0.254 |
| G" | 1.230 | 1.050 | 0.872 | 0.605 |

This example shows that the most effective composition for reducing the hysteresis at low deformations is the composition in which both DPG and DFDCHMI are present (Composition 19).

EXAMPLE 5

The following four compositions are used:

Composition 20: Basic formula F1 where the SBR is SSBR A;
Composition 21 Composition 20 to which 0.4 pce (2.2 mmoles) of dicyclohexylamine (DCHA) has been added;
Composition 22: Composition 20 to which 0.8 mmoles (3.8 mmoles) of DCHA has been added;
Composition 23: Composition 20 to which 0.8 pce (3 mmoles) of DDCHMI has been added.

Composition 20 is the control composition, while Compositions 21 to 23 are in conformity with the invention.

The compositions are prepared and vulcanized as in Example 1. The addition of the amines for Compositions 21, 22 and 23 is done with the aid of the internal mixer during the first stage of this thermomechanical operation.

The results are given in Table 6.

TABLE 6

| Compositions | 20 | 21 | 22 | 23 |
|---|---|---|---|---|
| Formula | F1 | F1 | F1 | F1 |
| DCHA (pce) (mmoles) | 0 | 0.4/2.2 | 0.8/3.8 | 0 |
| DDCHMI ADDED (pce/mmoles)) | 0 | 0 | 0 | 0.8/3 |
| Properties in the nonvulcanized state: | | | | |
| ML (1 + 4) 100° | 51 | 51 | 50 | 51 |
| Properties in the vulcanized state: | | | | |
| Shore | 64.0 | 63.1 | 61.8 | 59.4 |
| EM 10 | 5.10 | 4.78 | 4.79 | 3.95 |
| EM 100 | 1.72 | 1.70 | 1.72 | 1.57 |
| EM 300 | 2.03 | 2.03 | 2.06 | 1.96 |
| EM 300/EM 100 | 1.18 | 19.8 | 20.3 | 19.0 |
| Scott 20° Fr | 18.1 | 19.8 | 20.3 | 19.0 |
| Er % | 520 | 650 | 560 | 570 |
| HL (def = 35) | 33.6 | 30.5 | 30.3 | 29.4 |
| Dynamic properties under deformation (10 Hz/def 0.15%–50%): | | | | |
| DeltaG* | 4.05 | 3.42 | 3.23 | 1.95 |
| tgδ | 0.355 | 0.327 | 0.322 | 0.266 |
| G" | 1.230 | 1.070 | 1.010 | 0.690 |

This example shows that addition of amines DCHA and DDCHMI makes it possible to reduce the hysteresis at low and high deformations in comparison to the control. However, DDCHMI (Composition 23) is more effective.

EXAMPLE 6

The following compositions are used:

Composition 24: Formula F1 where the SBR is SSBR A;
Composition 25: Composition 24 to which 0.8 pec of DDCHMI has been added;
Composition 26: Composition 24 where 5.7 pce of Si266 made by Degussa (bispropyltriethoxysilane disulfide) was used instead of 6.4 pce of Si69;
Composition 27: Composition 26, which additionally contains 0.8 pce of DDCHMI.

Compositions 25 and 27 are according to the invention; compositions 24 and 26 are control compositions.

The compositions are prepared and vulcanized as in Example 1. For Compositions 25 and 27, the amines are added with the aid of the internal mixer during the first stage of this thermomechanical operation.

The results are listed in Table 7.

TABLE 7

| Compositions | 24 | 25 | 26 | 27 |
|---|---|---|---|---|
| Formula | F1 | F1 | F1 | F1 |
| Si69 (pce) | 6.4 | 6.4 | 0 | 0 |
| DDCHMI (pce) | 0 | 0.8 | 0 | 0.8 |
| Properties in the nonvulcanized state: | | | | |
| ML (1 + 4) 100° | 51 | 51 | 49 | 48 |
| Properties in the vulcanized state: | | | | |
| Shore | 64.0 | 59.4 | 59.0 | 58.2 |
| EM 10 | 5.10 | 3.95 | 4.09 | 4.01 |
| EM 100 | 1.72 | 1.57 | 1.20 | 1.18 |
| EM 300 | 2.03 | 1.96 | 1.19 | 1.11 |
| EM 300/EM 100 | 1.18 | 1.25 | 0.99 | 0.94 |
| Scott 20° Fr | 18.1 | 19.0 | 16.1 | 15.0 |
| Er % | 520 | 570 | 720 | 750 |
| HL (def = 35) | 33.2 | 29.4 | 42.8 | 44.1 |
| Dynamic properties under deformation (10 Hz/def 0.15%–50%): | | | | |
| DeltaG* | 4.05 | 1.95 | 2.68 | 2.38 |
| tgδ | 0.355 | 0.266 | 0.312 | 0.295 |
| G" | 1.230 | 0.690 | 0.905 | 0.818 |

This example shows that the addition of DDCHMI permits a major improvement of hysteresis at low deformations in the case of a linking agent that is in conformity with the invention (Si69 or Si266), and that the use of Si69 (comprising four sulfur atoms in the molecule) gives better results with regard to hysteresis at low and high deformations and with regard to reinforcement than does the use of Si266 which only has two sulfur atoms in its molecule.

EXAMPLE 7

The following compositions are used:

Composition 28: Formula F1 in which the SBR is SSBR A;
Composition 29: Formula F1 in which the SBR is SSBR B;
Composition 30: Composition 29 which only contains 3.2 pce of Si69;
Composition 31: Composition 29 devoid of linking agent;
Composition 32: Formula F1 in which the SBR is SSBR C;
Composition 33: Composition 32, in which the Si69 content is only 3.2 pce;
Composition 34: Composition 32 devoid of linking agent.

Compositions 29, 30, 32 and 33 are in accordance with the invention; Compositions 28, 31 and 34 are control compositions.

The compositions are prepared and vulcanized as in Example 1.

The results are given in Table 8.

TABLE 8

| | Compositions | | | | | | |
|---|---|---|---|---|---|---|---|
| | 28 | 29 | 30 | 31 | 32 | 33 | 34 |
| Formula | F1 | F1 | F1 | F1 | F1 | F1 | F1 |
| Si69 (pce) | 6.4 | 6.4 | 3.2 | 0 | 6.4 | 3.2 | 0 |
| SSBR | A | B | B | B | C | C | C |
| Properties in the non-vulcanized state: | | | | | | | |
| ML (1 + 4) 100° | 51 | 55 | 68 | 147 | 54 | 59 | 132 |
| Properties in the vulcanized state: | | | | | | | |
| Shore | 64.0 | 58.8 | 60.0 | 66.8 | 56.5 | 59.2 | 65.0 |
| EM10 | 5.10 | 3.83 | 4.64 | 7.65 | 3.48 | 4.33 | 7.28 |
| EM100 | 1.72 | 1.71 | 1.36 | 0.94 | 1.61 | 1.37 | 0.78 |
| EM300 | 2.03 | 2.26 | 1.52 | 0.52 | 2.19 | 1.59 | 0.41 |
| EM300/EM100 | 1.18 | 1.32 | 1.12 | 0.55 | 1.36 | 1.16 | 0.53 |
| Scott20° Fr | 18.1 | 20.9 | 180 | 8.0 | 20.4 | 18.6 | 7.1 |
| Er % | 520 | 580 | 720 | 1030 | 580 | 680 | 1020 |
| HL (def = 35%) | 33.2 | 25.1 | 33.5 | 54.7 | 26.1 | 33.7 | 59.9 |
| Dynamic properties under deformation (10 Hz/def 0.15%–50%): | | | | | | | |
| DeltaG* | 4.05 | 1.09 | 1.74 | 4.32 | 1.03 | 1.77 | 5.15 |
| tgδ | 0.355 | 0.216 | 0.242 | 0.263 | 0.224 | 0.252 | 0.297 |
| G" | 1.230 | 0.433 | 0.590 | 1.110 | 0.436 | 0.618 | 1.390 |

This example shows that the presence of amino groups is not sufficient to improve the balance between hysteretic properties and mechanical cohesion; also necessary is the presence of a linking agent according to Formula (I), and the content of linking agent or ensemble of linking agents in accordance with this formula should preferably be at least equal to 4% by weight of the content of the silica or mixture of silicas, which is the case in Compositions 29, 30, 32 and 33. The results are better for compositions 29 and 32 where the linking agent content is more than 4% of the weight of silica.

It is to be understood that the invention is not limited to the above-described embodiments, on the basis of which it is possible to envisage other modes of carrying out the invention.

What is claimed is:

1. A rubber composition vulcanizable with sulfur which comprises a) at least one polymer selected from the group consisting of diene polymers, olefin/monomeric diene copolymers and halogenated isoolefin/para-alkylstyrene copolymers;
   b) silica or mixture of silicas as filler;
   c) at least one agent promoting linking between the silica and the polymer, said agent having the formula $$Z^1—R^1—S_n—R^2—Z^2 \qquad (I)$$

wherein n is an integer between 2 and 8, $R^1$ and $R^2$, which may be the same or different, are each selected from among substituted or unsubstituted alkylene groups having 1 to 18 carbon atoms and of substituted or unsubstituted arylene groups having 6 to 12 carbon atoms, $Z^1$ and $Z^2$, which may be the same or different, each represents a group

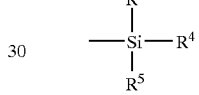

wherein $R^3$, $R^4$ and $R^5$, which may be the same or different, are each selected from among alkyl groups having 1 to 4 carbon atoms, phenyl groups, alkoxy groups having 1 to 8 carbon atoms, and cycloalkoxy groups having 5 to 8 carbon atoms, with the proviso that at least one of $R^3$, $R^4$ and $R^5$ is an alkoxy or cycloalkoxy; and d) at least one guanidine substituted by at least two groups, which may be the same or different, and each selected from among alkyl, aryl or aralkyl groups;

wherein the composition satisfies at least one of the following features (i) and/or (ii):
   (i) the composition comprises at least one diene polymer which has at least one amino terminal group of an aliphatic or cycloaliphatic amine which is bonded thereto at the end of the chain, the polymer then being devoid of alkoxysilane and silanol group; and
   (ii) the composition comprises at least one free aliphatic or cycloaliphatic amine.

2. Composition according to claim 1 wherein the filler comprises at least 40% by weight of silica.

3. Composition according to claim 1 wherein in the linking agent of formula (I), n is greater than 2 and up to 8, or if there are several such agents, at least 80% of n is greater than 2 and up to 8 for the total of these agents.

4. Composition according to claim 1 wherein the agent of formula (I) or mixture of such agents comprises at least 4% by weight calculated on the weight of silica or mixture comprising silica used as filler.

5. Composition according to claim 1 wherein the guanidine or mixture of guanidines comprises 0.5 to 4% by weight calculated on the weight of silica or mixture of silicas as filler.

6. Composition according to claim 5 wherein the guanidine or mixture of guanidines comprises 1 to 3% by weight of the filler.

7. Composition according to claim 1, wherein the free aliphatic or cycloaliphatic amine, or mixture of free aliphatic or cycloaliphatic amines, comprises 0.5 to 4% by weight calculated on the weight of silica or mixtures of silicas as filler.

8. Composition according to claim 7 wherein the aliphatic or cycloaliphatic amine comprises 1 to 3% by weight of filler.

9. Composition according to claim 1, comprising at least one free aliphatic or cycloaliphatic amine homogeneously dispersed in the composition.

10. A method of preparing a composition according to claim 9 comprising in order preparing the polymer in solution, stopping the polymerization, adding the aliphatic or cycloaliphatic amine to the solution, and stripping the solvent.

11. Tire tread comprising at least one composition according to claim 1.

12. Tread obtained by vulcanization of the tread according to claim 11.

13. Tire casing comprising at least one composition according to claim 1.

14. Tire casing obtained by vulcanizing the tire casing according to claim 13.

15. A rubber composition vulcanizable with sulfur which comprises a) at least one polymer selected from the group consisting of diene polymers, olefin/monomeric diene copolymers and halogenated isoolefin/para-alkylstyrene copolymers;

b) silica or mixture of silicas as filler;

c) at least one agent promoting linking between the silica and the polymer, said agent having the formula $$Z^1\text{—}R^1\text{—}S_n\text{—}R^2\text{—}Z^2 \tag{I}$$

wherein n is an integer between 2 and 8, $R^1$ and $R^2$, which may be the same or different, are each selected from among substituted or unsubstituted alkylene groups having 1 to 18 carbon atoms and of substituted or unsubstituted arylene groups having 6 to 12 carbon atoms, $Z^1$ and $Z^2$, which may be the same or different, each represents a group

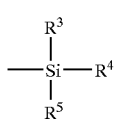

wherein $R^3$, $R^4$ and $R^5$, which may be the same or different, are each selected from among alkyl groups having 1 to 4 carbon atoms, phenyl groups, alkoxy groups having 1 to 8 carbon atoms, and cycloalkoxy groups having 5 to 8 carbon atoms, with the proviso that at least one of $R^3$, $R^4$ and $R^5$ is an alkoxy or cycloalkoxy; and d) at least one guanidine substituted by at least two groups, which may be the same or different, and each selected from among alkyl, aryl or aralkyl groups;

wherein the composition comprises at least one diene polymer which has at least one amino terminal group of an aliphatic or cycloaliphatic amine which is bonded thereto at the end of the chain, the polymer then being devoid of alkoxysilane and silanol group.

16. A rubber composition vulcanizable with sulfur which comprises a) at least one polymer selected from the group consisting of diene polymers, olefin/monomeric diene copolymers and halogenated isoolefin/para-alkylstyrene copolymers;

b) silica or mixture of silicas as filler;

c) at least one agent promoting linking between the silica and the polymer, said agent having the formula $$Z^1\text{—}R^1\text{—}S_n\text{—}R^2\text{—}Z^2 \tag{I}$$

wherein n is an integer between 2 and 8, $R^1$ and $R^2$, which may be the same or different, are each selected from among substituted or unsubstituted alkylene groups having 1 to 18 carbon atoms and of substituted or unsubstituted arylene groups having 6 to 12 carbon atoms, $Z^1$ and $Z^2$, which may be the same or different, each represents a group

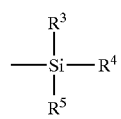

wherein $R^3$, $R^4$ and $R^5$, which may be the same or different, are each selected from among alkyl groups having 1 to 4 carbon atoms, phenyl groups, alkoxy groups having 1 to 8 carbon atoms, and cycloalkoxy groups having 5 to 8 carbon atoms, with the proviso that at least one of $R^3$, $R^4$ and $R^5$ is an alkoxy or cycloalkoxy; and d) at least one guanidine substituted by at least two groups, which may be the same or different, and each selected from among alkyl, aryl or aralkyl groups;

wherein the composition satisfies both of the following features (i) and (ii):

(i) the composition comprises at least one diene polymer which has at least one amino terminal group of an aliphatic or cycloaliphatic amine which is bonded thereto at the end of the chain, the polymer then being devoid of alkoxysilane and silanol group; and (ii) the composition comprises at least one free aliphatic or cycloaliphatic amine.

* * * * *